United States Patent [19]

Mizuno

[11] 4,266,212
[45] May 5, 1981

[54] APPARATUS FOR CONTROLLING VEHICLE DIRECTIONAL LAMPS

[75] Inventor: Tiaki Mizuno, Toyota, Japan

[73] Assignee: Nippondenso Co., Ltd., Kariya, Japan

[21] Appl. No.: 66,826

[22] Filed: Aug. 15, 1979

[30] Foreign Application Priority Data

Sep. 20, 1978 [JP] Japan .................................. 53-115500

[51] Int. Cl.³ .......................... B60Q 1/38; G08B 5/38
[52] U.S. Cl. .................................. 340/81 R; 340/331; 340/642
[58] Field of Search .................. 340/81 F, 81 R, 73, 340/331, 642

[56] References Cited

U.S. PATENT DOCUMENTS 3,668,678  6/1972  Porter .............................. 340/73 X
4,150,359  4/1979  Mizuno et al. .................. 340/73 X Primary Examiner—Donald J. Yusko
Attorney, Agent, or Firm—Cushman, Darby & Cushman

[57] ABSTRACT

An improved apparatus for use in the turn-direction indicating system of a vehicle having directional lamps energized by a battery through a current detecting resistor, a relay and a direction selecting switch. The relay is energized to close periodically in response to periodic pulses produced by a semiconductor integrated control circuit so that the directional lamps flash periodically. A protection circuit which is connected in series with a resistor across the battery render the output transistor of the semiconductor integrated control circuit ON in response to an excessively large positive voltage so that the electric current which flows through the output transistor is limited by the inherent resistance of the relay coil connected in series with the output transistor. A diode which is connected in series with the relay coil render the output transistor ON reversely in response to an excessively large negative voltage so that the electric current is limited by the relay coil.

2 Claims, 2 Drawing Figures

100
APPARATUS FOR CONTROLLING VEHICLE DIRECTIONAL LAMPS

BACKGROUND OF THE INVENTION

The present invention relates to an apparatus for controlling periodic flashings of vehicle directional lamps and particularly to an improvement in the protection of the semiconductor integrated circuit which control the periodic flashings of the directional lamps.

It is known well in the turn-direction indicating system of an automotive vehicle that a group of front, rear and side directional lamps are energized in response to periodic pulses produced by an electronic control circuit designed to be integrated into a semiconductor chip. One of this system is disclosed in the U.S. Pat. No. 3,858,177 issued on Dec. 31, 1974, for example.

Such a semiconductor integrated control circuit is connected to a storage battery. Other electric devices such as electric motors, relays and ignition coils which often generate undesired excessively large voltage are also connected to the storage battery. When the undesired voltage exceeds ±100 volts, the semiconductor integrated circuit which has a maximum allowable voltage of 40~60 volts when manufactured in a bipolar linear integrated circuit process is broken down.

SUMMARY OF THE INVENTION

It is therefore an object of the present invention to provide an apparatus in which a semiconductor integrated control circuit for vehicle directional lamps is prevented from breakdown caused by excessively large voltages.

DETAILED DESCRIPTION OF THE PREFERRED EMBODIMENTS

Figure 1:
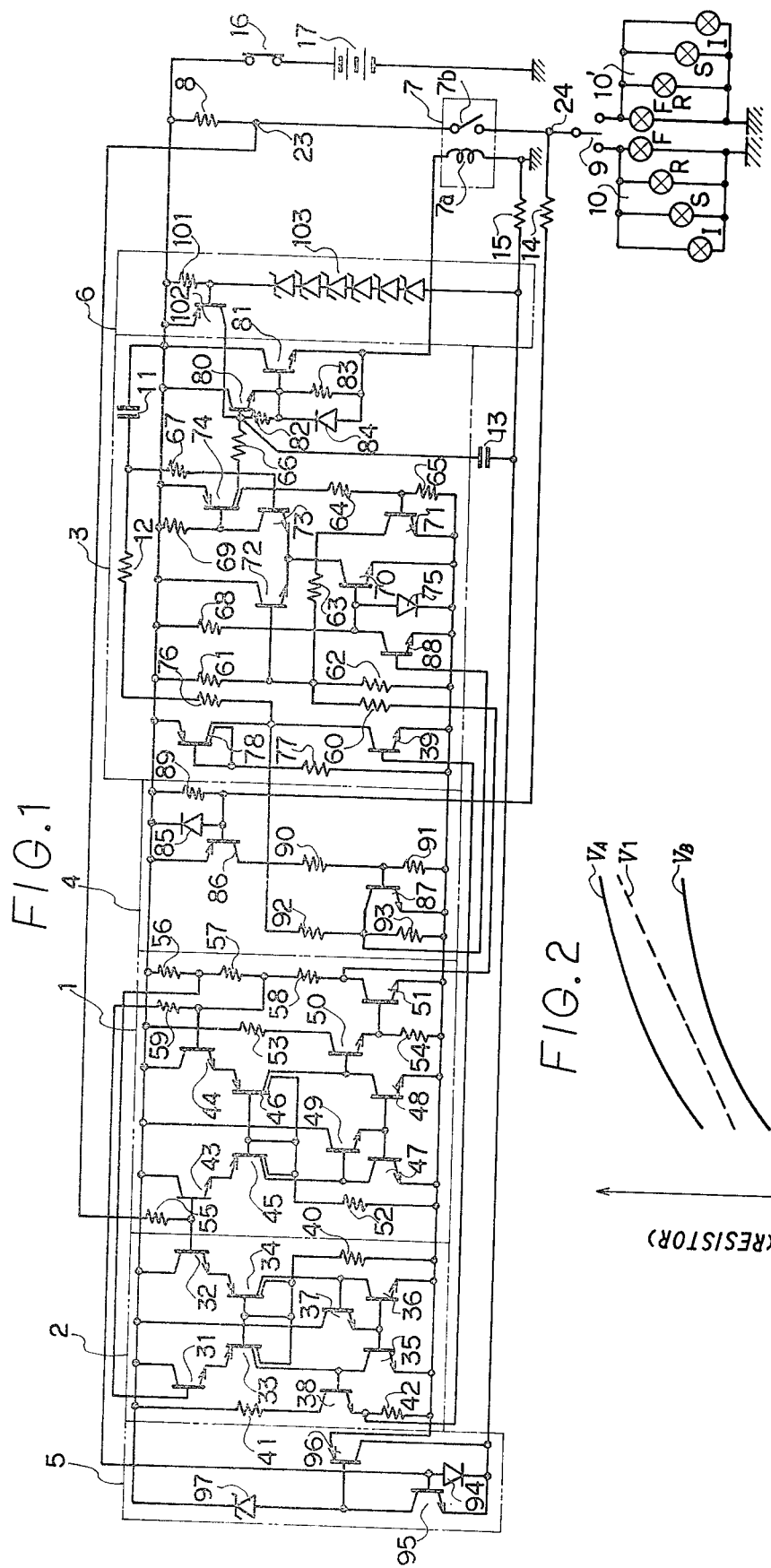
FIG. 1 is an electric wiring diagram illustrating an embodiment of the present invention.
Figure 2:
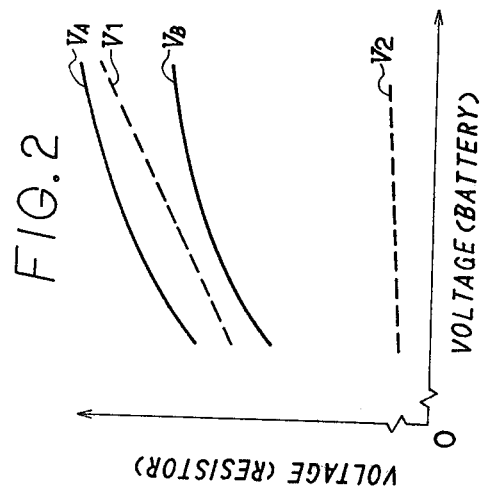
FIG. 2 is a characteristic chart illustrating relations between the voltage appeared across a battery and a current detecting resistor in the embodiment.

Referring first to FIG. 1, two directional lamp groups 10 and 10' are shown in series connection with a manually-operated turn-direction selecting switch 9, a relay 7, a current detecting resistor 8 having low resistance (0.01~0.1 ohm), a battery switch 16 and a storage battery 17 having the supply voltage (12 volts). The directional lamp groups 10 and 10' are mounted on respective left and right portions of an automotive vehicle, for example. As is well known, either one of directional lamp groups 10 and 10' is energized upon closure of the selecting switch 9 by the battery 12 through the battery switch 16, the resistor 8 and the relay 7. The relay 7 is energized periodically during the closure of the selection switch 9 to cause the lamp group 10 or 10' to flash periodically for indicating the turning direction of the vehicle. It should be noticed that the relay 7 having a coil 7a and a switch 7b is normally-open type, or normally-nonconductive type, so that the resistor 8 and the selection switch 9 is normally disconnected. It should be noticed further that each of the lamp groups 10 and 10' comprises a front, rear, side and interior directional lamps which are connected in parallel with each other and denoted by respective alphabetical letters F, R, S and I. The directional lamps F, R and S are mounted on respective front, rear and side outside portions of the vehicle, whereas the directional lamp I is mounted on an inside portion of the vehicle. The front and rear lamps F and R (23 watts) consume more electric energy than the side lamp S (8 watts) which consumes more electric energy than the interior lamp I (3 watts). Since the voltage across the resistor 8 is proportional to the total current flowing from the battery 17 into the lamps F, R, S and I, the voltage across the resistor 8 becomes smaller when the lamp F or R is disconnected than when none of the lamps F, R, S and I are disconnected. The voltage across the resistor 8 is dependent on the voltage across the battery 17 as well as on lamp failures. Voltage changes across the resistor 8 are shown in FIG. 2 in relation to the voltage change across the battery 17. Characteristic curves $V_A$ and $V_B$ represent the voltages across the resistor 8 in respective cases of the absence of disconnection in the lamps and the presence of disconnection in the lamp F or R.

Provided to control the energization of the relay 7 is an electronic circuit comprising a first comparator 1, a second comparator 2, a pulse generator 3, a logic circuit 4 and a voltage regulator 5 which are integrated into a semiconductor chip. The electronic circuit further includes a protection circuit 6 connected in series with a resistor 5 which is grounded. The protection circuit 6 is also integrated into the semiconductor chip. A capacitor 13 is connected in series with the resistor 15 and a resistor 14 is connected to the junction 24.

The voltage regulator 5 is connected to the battery 17 to supply the first and second comparators 1 and 2, the pulse generator 3 and the logic circuit 4 with a regulated constant voltage. The voltage regulator 5 comprises a diode 94, a zener diode 97 and transistors 95 and 96. The zener diode 97 having a constant breakdown voltage (5~7 volts) is connected in series with the emitter-collector path of the transistor 95 between the resistor 15 and a positive bus $l_1$ connected to the positive terminal of the battery 17. The base, emitter and collector of the transistor 96 are connected to the zener diode 97, a negative bus $l_2$ and the resistor 15, respectively, so that the negative bus $l_2$ is kept at a potential proportional to the potential on the positive bus $l_1$. Therefore, the voltage between the positive and negative buses $l_1$ and $l_2$ is regulated substantially at the breakdown voltage of the zener diode 97.

The first comparator 1 comprises transistors 43, 44, 45, 46, 47, 48, 49, 50 and 51 and resistors 52, 53, 54, 55, 56, 57 and 58. The emitter-collector paths of the transistors 43, 45 and 47 are connected in series between the positive and negative buses $l_1$ and $l_2$, whereas the emitter-collector paths of the transistors 44, 46 and 48 are connected in series between the positive and negative buses $l_1$ and $l_2$. The bases of the transistors 45 and 46 are connected to each other and the bases of the transistors 47 and 48 are connected to each other. The base of the output transistor 51 connected in series with the resistors 56, 57 and 58 is connected to the emitter of the transistor 50 connected to the collector of the transistor 46. The base of the input transistor 43 is connected to the junction 23 between the relay 7 and the current detecting resistor 8 through the resistor 55 to receive the voltage appeared across the resistor 8. The base of the input transistor 44 is connected to the junction among the resistors 57, 58 and 59 to receive the first reference voltage $V_1$ appeared across the resistors 56 and 57. As shown in FIG. 2, the first reference voltage $V_1$ which is proportional to the voltage across the battery 17 because of the resistor 59 connected to the diode 94 of the voltage regulator 5 is determined to be smaller and larger than the respective voltages $V_A$ AND $V_B$.

The second comparator 2 comprises transistors 31, 32, 33, 34, 35, 36, 37, and 38 and resistors 40, 41, and 42. The emitter-collector paths of the transistors 31, 33, and 35 are connected in series between the positive and negative buses $1_1$ and $1_2$, whereas the emitter-collector paths of the transistors 32, 34 and 36 are connected in series between the positive and negative buses $1_1$ and $1_2$. The bases of the transistors 33 and 34 are connected to each other, and the bases of the transistors 34 and 36 are connected to each other. The base of the output transistor 38 is connected to the collectors of the transistors 33 and 35. The base of the input transistor 32 is connected to the junction between the relay 7 and the current detecting resistor 8 through the resistor 55 to receive the voltage appeared across the resistor 8. The base of the input transistor 31 is connected to the junction between the resistors 56 and 57 of the first comparator 1 to receive the second reference voltage $V_2$ appeared across the resistor 56. As shown in FIG. 2, the second reference voltage $V_2$ which is also proportional to the voltage across the battery 17 is determined to be much smaller and a little larger than the voltage $V_B$ and the zero voltage, respectively.

The pulse generator 3 comprises transistors 39, 70, 71, 72, 73, 74, 78, 80 and 81, a capacitor 11, diodes 75 and 84 and resistors 60, 61, 62, 63, 64, 65, 66, 67, 68, 69, 76, 77, 82 and 83. The base of the transistor 72 is connected to the junction among the resistors 60, 61, 62, and 63 to receive a reference voltage $V_0$ produced across the resistor 61. The reference voltage $V_0$ is varied in response to the voltage applied through the resistor 63 from the transistor 71 and to the output voltage of the comparator 1 applied through the resistor 60. The base of the transistor 73 is connected to the junction between the capacitor 11 and the resistor 12 through the resistor 67 to receive the voltage across the capacitor 11 which is adapted to charge and discharge alternately. The capacitor 11 and the resistor 12 are connected in series with the resistor 76 and the transistor 39 between the positive and negative buses $1_1$ and $1_2$. The emitters of the transistors 72 and 73 are connected in series with the transistor 70 which receives the output voltage of the logic circuit 4 through the transistor 88. The collector of the transistor 73 is connected through the transistor 74 and the resistor 66 to the transistor 80 which is connected to the output transistor 81 connected in series with the relay coil 7a. The diode 84 connected in series with the resistor 82 is connected in parallel with the base-emitter path of the output transistor 81. In the pulse generator 3, only the capacitor 11 and the resistor 12 are not integrated into the semiconductor chip but connected outside the semiconductor chip because of difficulty in integration.

The logic circuit 4 comprises transistors 86 and 87, a diode 85, and resistors 89, 90, 91, 92 and 93. The base of the transistor 86 is connected to the positive bus $1_1$ through the resistor 89 and to the junction 24 between the relay switch 7b and the selecting switch 9 through the resistor 14. The collector of the output transistor 87 is connected through the resistor 92 to the collector of the transistor 39 of the pulse generator 3.

The protection circuit 6 comprises a resistor 101, a transistor 102 and zener diodes 103. The base of the transistor 102 the emitter of which is connected to the positive bus $1_1$ is connected to the junction between the resistor 101 and the zener diodes 103. The collector of the transistor 102 is connected to the base of the transistor 80 of the pulse generator 3. The zener diodes 103 having the constant breakdown voltage (40~60 volts) are connected to the ground through the resistor 15.

Next, operation of the embodiment is described. When the turn-direction selecting switch 9 is open, electric current does not flow from the battery 17 to the directional lamp groups 10 and 10' through the current detecting resistor 8. With the zero voltage appeared across the resistor 8, the transistors 32, 34, 35, 36 and 37 of the second comparator 2 are rendered ON, and the transistors 31, 33 and 38 are rendered OFF to render the transistor 39 of the pulse generator 3 OFF. The transistors 86 and 87 of the logic circuit 4 are rendered OFF. In response to the OFF condition of the transistor 87 of the logic circuit 4, the transistor 88 of the pulse generator 3 is rendered ON, and the transistor 70 is rendered OFF to render the transistors 73, 74, 80 and 81 OFF. The transistors 80 and 81 rendered OFF deenergize the coil 7a to keep the normally-open switch 7b open. The transistor 39 rendered OFF prevents the capacitor 11 from charging.

As soon as the selecting switch 9 is closed to contact with either lamp group 10 or 10' in which no lamp is disconnected, the junction 24 produces the low level voltage with the relay switch 7b still opening. In response to the low level voltage appeared across the lamp group 10 or 10', or at the junction 24, the transistors 86 and 87 of the logic circuit 4 are rendered ON to render the transistors 88 and 70 OFF and ON, respectively. Since the capacitor 11 is not charged enough at this instant, the transistors 71, 73, 74, 80 and 81 are rendered ON to energize the coil 7a to close the normally-open switch 7b. With the switch 7b being closed, the electric current flows from the battery 17 through the resistor 8 having the low resistance to allow the lamp group 10 or 10' to start flashing. When the electric current starts flowing through the lamp group 10 or 10', the voltage appeared at the terminal 24 increases to render the transistors 86 and 87 of the logic circuit 4 OFF which is liable to render the transistors 88 and 70 ON and OFF, respectively. However, since the resistor 8 produces the voltage $V_A$ much larger than the second reference voltage $V_2$, the transistors 31, 33 and 38 of the second comparator 2 are rendered ON to render the transistor 39 of the pulse generator 3 ON which keeps the low level output voltage of the logic circuit 4. As a result, the transistors 88 and 70 are kept OFF and ON respectively, and the transistors 71, 73, 74, 80 and 81 rendered ON in response to the closure of the selecting switch 7 is prevented from being rendered OFF. On this occasion, the transistors 44, 50 and 51 of the first comparator 1 are rendered ON to produce the low level output voltage.

During ON conditions of the transistors 70, 71, 73, 74, 80 and 81 of the pulse generator 3, the capacitor 11 charges through the resistors 12 and 76 and the transistor 39 to produce thereacross a charged voltage which exponentially increases. When the charged voltage applied to the transistor 73 reaches the reference voltage $V_{OL}$ determined by the resistors 60, 61, 62 and 63 in response to the low level output voltage produced across the transistor 51 of the first comparator 1, the transistor 72 is rendered OFF to render the transistors 71, 73, 74, 80 and 81 OFF. The coil 7a is responsively deenergized to open the switch 7b. As a result, the lamp group 10 or 10' through which the electric current does not flow stops flashing for a while. On this occasion, since the voltage across the resistor 8 disappears, the transistors 44, 50 and 51 are rendered OFF. The transistors 32, 34, 35, 36 and 37 of the second comparator 2 are rendered ON in response to the opening of the switch 7b to render the transistor 39 of the pulse generator 3 OFF. The OFF condition of the transistor 39 prevents the capacitor 11 from charging.

During OFF conditions of the transistors 71, 73, 74, 80 and 81 of the pulse generator 3, the discharging current flows from the transistor 78 to the capacitor 11 through the resistors 76 and 12 so that the capacitor 11 discharges to produce a discharged voltage which exponentially decreases. When the discharged voltage applied to the transistor 73 reaches the reference voltage $V_{OH}$ determined by the resistors 60, 61 and 62 in response to the high level output voltage produced across the transistor 51 of the first comparator 1, the transistors 71, 73, 74, 80 and 81 are rendered ON to render the transistor 72 OFF. The coil 7a is responsively energized to close the switch 7b. As a result, the lamp group 10 or 10' through which the electric current flows starts flashing again.

As long as the selecting switch 9 is kept closed, the abovedescribed operation is repeated to allow the pulse generator 3 to generate a train of pulses which control the flashing of the lamp group 10 or 10'. Since the capacitor 11 charges and discharges alternately at respective time constants, the pulses generated from the pulse generator 3 are kept at a constant frequency to enable the periodic flashings of the lamp group 10 or 10'.

The frequency and duty cycle of periodic flashings of the lamp group 10 or 10' are increased and decreased, respectively, in the following manner, when either the front or rear lamp F or R is disconnected. Upon disconnection of either the front or rear lamp F or R, the voltage $V_B$ appeared across the resistor 8 becomes smaller than the reference voltage $V_1$ of the first comparator 1. Therefore, the transistors 43, 45, 48, 49 are rendered ON, and the transistors 44, 46, 50 and 51 are rendered OFF. The comparator 1 keeps applying the high level voltage produced across the transistor 51 to the junction between the resistors 61 and 62 of the pulse generator 3 in the same manner as in the case of opening of the switch 7b. The reference voltage applied to the transistor 72 during the charging of the capacitor 11 is kept at $V_{OL}'$ smaller than $V_{OL}$, whereas the reference voltage $V_{OH}$ applied during the discharging of the capacitor 11 is kept unchanged. Since the charged voltage and the discharged voltage across the capacitor 11 are compared with respective voltages $V_{OL}'$ and $V_{OH}$ which have smaller difference than the voltages $V_{OL}$ and $V_{OH}$ have, the frequency and the duty cycle of the charging of the capacitor 11 are increased and decreased, respectively. As a result, the frequency and the duty cycle of the periodic pulses of the pulse generator 3 which energizes the relay 7 is increased and decreased, respectively. The increase in the flashing frequency may be observed by a vehicle operator through the interior lamp I.

It should be noted in the above described operations that even when the negative going noise signal are accidentally induced on the positive bus $1_1$ to decrease the voltage of the battery 17 to zero volt, the comparators 1 and 2, the pulse generator 3 and the logic circuit 4 operate erroneously but are restored to to the same operating conditions after the disappearance of the noise signals as before the appearance of the noise signals. Therefore, flashing operation of the lamp groups 10 or 10' is stopped for only a short while but restored immediately.

The most important operation of the present invention is performed by the protection circuit 6 and the electronic components associated therewith in the following manner.

First of all, when an excessively large positive voltage which is in excess of the constant breakdown voltage (40~60 volts) of the zener diode 103 appears on the positive bus $1_1$, the zener diodes 103 conduct so that the electric current flows through the resistor 101, the zener diodes 103 and the resistor 15. Since this electric current is limited to a small value by the resistor 15, only a voltage which is smaller than the voltage across the resistor 101 and the zener diodes 103 is applied to the buses $1_1$ and $1_2$ to prevent the breakdown of the integrated electronic circuit. In this connection, the resistor 15 is connected outside the semiconductor. At the same time, the transistor 102 conducts to render the transistors 80 and 81 ON forcibly and the relay coil 7a is energized. Since the relay coil 7a has an inherent resistance (10 ohms), the voltage applied across the transistor 81 and the associated electronic components is decreased to prevent breakdown. The resistor 14 connected outside the semiconductor also limits the electric current which flows through the semiconductor.

Next, when an excessively large negative voltage appears on the positive bus $1_1$, the electric currents which flows through the resistors 14 and 15 are limited by the resistors 14 and 15. On this occasion, the electric current flows through the relay coil 7a, the diode 84 and the base-collector path of the transistor 81 which is NPN type. Since this electric current is limited by the inherent resistance of the relay coil 7a, only a portion of the excessively large voltage is applied to the transistor 81 and the transistor 81 and the associated electronic components are prevented from breakdown. It should be noted that no diode is connected in parallel with the relay coil 7a. This is because that, when a parallel diode is connected to absorb the counter electromotive force generated by the relay coil 7a, the parallel diode allows the excessive electric current to bypass the relay coil 7a and flow from the ground to the transistor 81. The capacitor 13 connected to the base of the transistor 80 and the resistor 15 is effective to obviate the parallel diode. Each time the transistor 74 is rendered ON and OFF, the transistors 80 and 81 are rendered ON and OFF only gradually by the capacitor 13 so that the relay coil 7a is energized and deenergized gradually. Therefore, the counter electromotive force generated by the relay 7a is decreased enough. The capacitor 13 is also effective to prevent the erroneous ON-OFF operation of the output transistors 80 and 81 caused by high frequency noise signals which often appear on the positive bus $1_1$.

The present invention is not limited to the above described embodiment but may be modified without departing from the spirit of the invention.

What is claimed is:

1. In a turn-direction indicating system of a vehicle in which either one of two lamp groups is connectable to a battery through a relay means having a relay coil and a relay switch, an apparatus comprising:
control circuit means effective to generate periodic pulse signals;

output transistor means the emitter-collector path of which is connected in series with said relay coil across said battery and the base of which is connected to said control means, said output transistor means being effective to energize and deenergize said relay coil in response to said periodic pulse signals;

resistor means;

protection circuit means connected in series with said resistor means across said battery and effective to render said output transistor means conductive when the voltage across said battery rises above the supply voltage of said battery;

a capacitor connected to the base of said output transistor means and effective to render said output transistor means conductive and nonconductive gradually in response to said periodic pulse signals; and a diode connected to the base of said output transistor means and to the junction between said output transistor means and said relay coil and effective to render said output transistor means conductive to thereby allow the electric current to flow through said relay coil in the reverse direction.

2. An apparatus according to claim 1, wherein said protection circuit means comprises:

zener diode means having a constant breakdown voltage larger than the supply voltage of said battery;

a resistor connected in series with said zener diode means; and a transistor connected to the base of said output transistor means and to the junction between said zener diode means and said resistor and effective to render said output transistor means conductive in response to the breakdown of said zener diode means.

* * * * *